Inventor:
Rudolf Prochnow
by Michael J. Striker
Attorney

APPARATUS FOR THE RECORDING OR PLAYBACK OF ELECTRICAL SIGNALS

Filed June 2, 1965 Sheet 2 of 2

Inventor:
Rudolf Prochnow
by Michael J. Striker
Attorney 3,429,992

APPARATUS FOR THE RECORDING OR PLAYBACK OF ELECTRICAL SIGNALS

Rudolf Prochnow, Darmstadt-Eberstadt, Germany, assignor to Fernseh G.m.b.H., Darmstadt, Germany
Filed June 2, 1965, Ser. No. 460,743
Claims priority, application Germany, June 6, 1964, F 43,113
U.S. Cl. 178—6.6 13 Claims
Int. Cl. H04n 5/78; G11b 5/52

ABSTRACT OF THE DISCLOSURE

A magnetic tape scanning arrangement for use in television apparatus. The magnetic tape has recorded signals in tracks transverse to its longitudinal direction of motion. The tape is moved past a drum upon which a plurality of transducer heads are mounted. A guide member brings the tape in close proximity to the transducer heads on the rotatable drum. An electric motor drives the drum by way of a slip clutch. The slip clutch is electromagnetically actuated and the amount of slip can be controlled by varying the current applied to the coil of the clutch. The tape transport mechanism which moves the magnetic tape along its longitudinal direction and against the transducer heads on the rotating drum is also driven by the same electric motor. A mechanical gear train may be interposed between the electric motor and the tape transport mechanism to provide for the proper speed at which the tape is moved longitudinally. The slippage of the clutch is controlled so that the angular speed of the drum is in predetermined relationship to the longitudinal speed of the moving magnetic tape.

Figure 1:
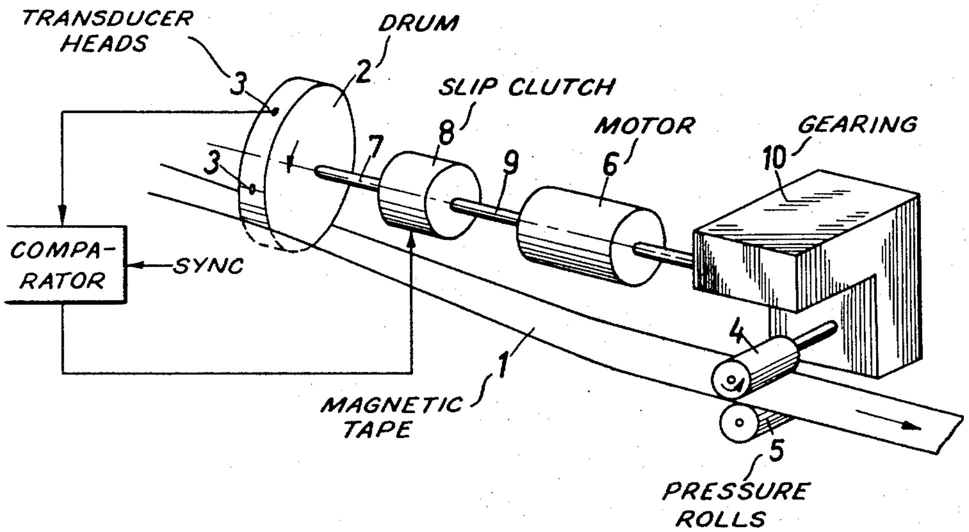

This invention relates to improved apparatus for the recording or playback of electrical signals which are recorded upon an elongated record carrier in a plurality of record tracks extending transversely or inclined to the length of the record carrier, by means of one or more transducer heads carried upon a rotating member, the record carrier being longitudinally transported by means of a capstan.

In known apparatus of this kind the rotating head-carrying member and the capstan are driven by individual motors and the speed and phasing of the head-carrying member, which is rigidly coupled with its driving motor, is controlled by means of a servo system. In such known apparatus a synchronous motor fed from the alternating-current mains is commonly employed to drive the capstan by which the record member is transported, while the member which carries the transducer head or heads is driven by another synchronous motor fed by way of a power amplifier with alternating current at a frequency determined by the servo system. The necessity of employing individual motors, as well as a high-power servo system, gives rise to a high cost which is disadvantageous particularly in the case of simpler devices for the recording of television signal in inclined tracks upon magnetic tape.

In improved apparatus according to the invention for the recording of television signals upon, or their playback from, an elongated record member upon which the signal tracks extend transversely or inclined to the length, by means of at least one transducer head carried upon a rotatable member, the rotatable member and a capstan employed to produce longitudinal movement of the record member are both driven by one and the same electric motor.

It is advantageous to provide, between the motor which drives the head-carrying member and the capstan and the head-carrying member itself, a slipping clutch, of which the slip is controlled by a control voltage representative of the relation between the head and a record track.

In a preferred embodiment of apparatus according to the invention a magnetic-powder clutch is employed as the slipping clutch. As is known, a magnetic powder clutch possesses the characteristic that over a wide range the transmitted torque is proportional to the exciting current applied to the clutch. It is particularly important in apparatus according to the invention that a magnetic powder clutch has a high efficiency. The transmitted torque may thus be controlled by a very small exciting current and a low power servo system is found to be adequate In a known embodiment of magnetic powder clutch there are fitted to the driving and to the driven shafts iron members separated by a few millimetres, between which is placed carbonyl-iron powder. If a magnetic field is produced between the members by means of an exciting winding, the iron particles congregate into chains in the direction of the lines of force, so that the driven shaft is urged to rotate with the driving shaft by a torque corresponding with the intensity of the magnetic field, and thus with the exciting current. In the absence of a magnetic field, that is, with the exciting current switched off, the particles of the iron powder are randomly disposed and practically no torque is transmitted. In another known form of magnetic powder clutch an oil-iron suspension is placed between the iron members.

Figure 2:
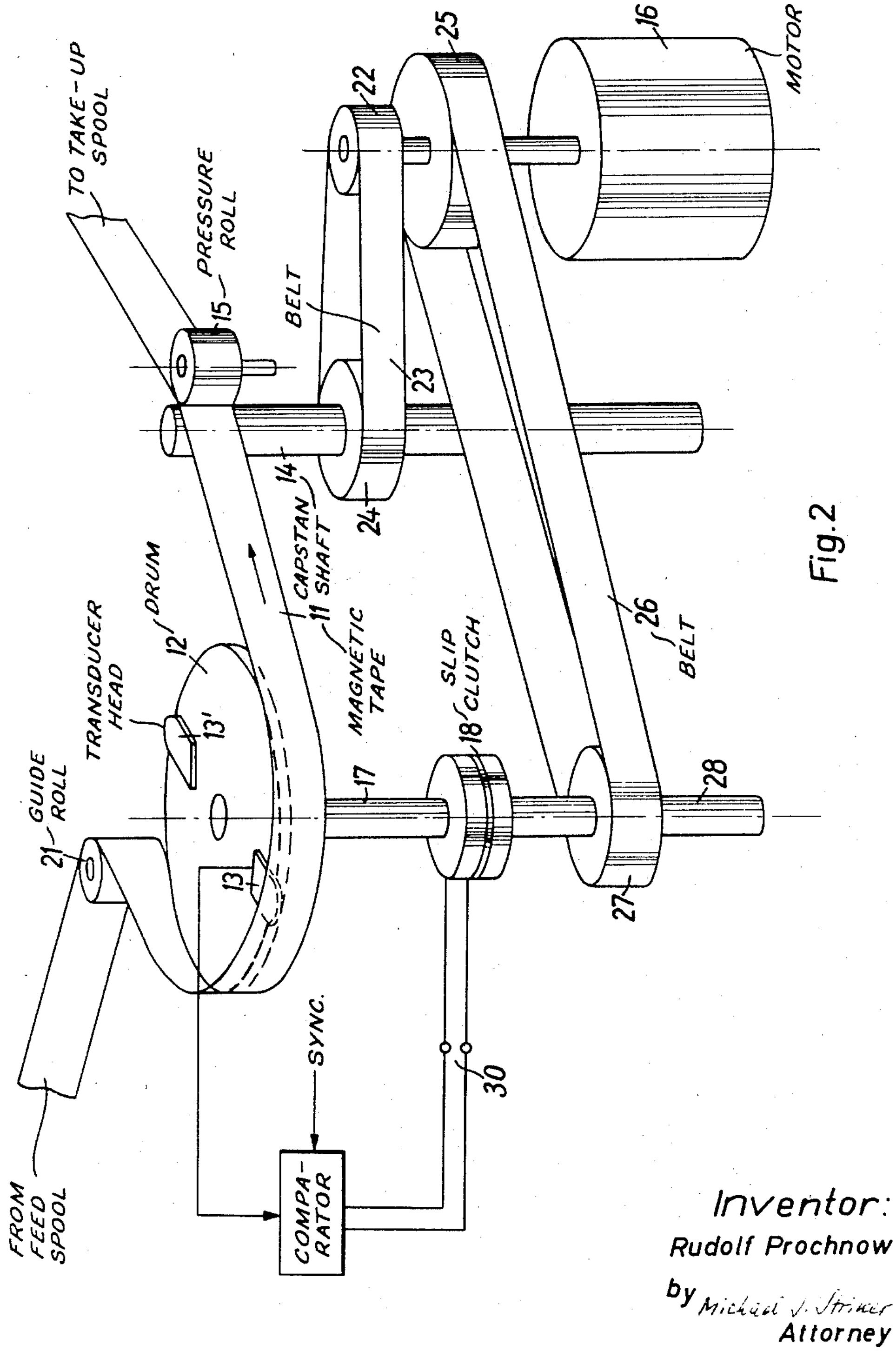

The invention will now be more particularly described with reference to the accompanying drawings, comprising FIGURES 1 and 2, of which:

FIGURE 1 is a schematic diagram illustrating the driving mechanism of one embodiment of apparatus according to the invention, in which a magnetic tape is scanned by means of a head-drum carrying four transducer heads traversing tracks extending transversely of the tape; and FIGURE 2 is a schematic diagram of the driving mechanism of another embodiment of apparatus according to the invention in which a magnetic tape is scanned in inclined tracks by two transducer heads.

FIGURE 1 shows schematically the driving mechanism of a television tape-recording machine in which recording is effected by means of a plurality of transducer heads equiangularly disposed about the circumference of a head drum so as to trace record tracks extending transversely of the magnetic tape, specifically approximately at right angles to its length. In the drawing, 1 denotes the magnetic tape and 2 the head drum carrying the magnetic transducer heads 3. The magnetic tape 1 is transported in the direction of the arrow past the head-drum 2 by means of a capstan 4 against which it is pressed by means of a pressure roller 5. By means of a suitable guide, not shown in the drawing, the tape is curved in the region of the head drum to follow the curved path of the pole tips of the magnetic transducer heads 3.

The head-drum 2 and the capstan 4 are driven by means of a single electric motor 6. Between the driving shaft 7 of the head-drum 2 and the motor 6 there is provided a slipping clutch 8. The shaft 9 which is connected to the driving portion of the slipping clutch turns at a higher speed than the nominal speed of rotation of the head drum 2. Shaft 9 can obviously either be driven directly by motor 6, or through the intermediary of suitable gearing. At the same time, the motor 6 drives the capstan 4 for the longitudinal transport of the tape by way of suitable gearing 10.

FIGURE 2 shows schematically a driving mechanism according to the invention for a magnetic tape machine suitable for the recording of television signals or other wide-band signals, in which during recording the transducer heads traverse tracks extending at relatively small angles to the length of the magnetic tape. The magnetic tape 11 is wound in the form of a part-helix about the rotating head-drum 12. A rotating shaft 14, against which the tape is pressed by means of a pressure roller 15, transports the tape in the direction of the arrow. A head-drum 12 may carry, for example, two heads 13 and 13' mutually displaced by 180°. The magnetic tape drawn from a feed spool (not shown) is lead over a guide roller 21, encompasses rather more than half the circumference of the head-drum 12 and, after passing through the transport device 14, 15, is taken up on a further tape spool (not shown).

According to the invention, driving of both the head-drum 12 and the tape transport device 14, 15, is effected by the single motor 16. The shaft which forms the capstan of the tape transport device is driven by a belt drive, consisting of a belt-pulley 22 on the shaft of the motor 16, a belt 23 and another belt-pulley 24 arranged on the capstan shaft 14. A second belt-pulley 25 on the motor shaft drives, by way of a belt 26 and a further belt-pulley 27, a shaft 28 which is coaxial with the shaft 17 upon which the head drum 12 is mounted. The shafts 17 and 28 are connected by a slipping clutch 18. For this purpose one half of the clutch is rigidly connected with the shaft 28 and the other half with the shaft 17. The slipping clutch is formed as a magnetic powder clutch; the exciting current is fed to the clutch from connections 30. The shaft 28 rotates at a somewhat higher speed than the nominal speed of rotation of the head drum 12. The difference in speed is taken up by the slipping clutch 18.

To control the speed and the angular position of the head drum, the speed of the head drum is determined in known manner by a control voltage, which is developed by comparison of the phasing of the vertical synchronizing impulses of the television signal with impulses dependent upon the speed and position of the head drum. In the arrangement described this control voltage is used to alter the excitation of the slipping clutch in such a manner that a current dependent upon the difference in phasing of the impulses from the head wheel and those in the television signal is applied to the clutch connections 30.

The invention is not limited to the specific embodiments described above, but may be carried out by apparatus modified from that described in ways which are obvious to those skilled in the art. For example, some other form of controllable friction clutch may be employed instead of the magnetic clutch described above. A clutch employing direct electrical control, for example, a clutch making use of eddy-current coupling, is particularly suitable.

What is claimed and desired to be secured by Letters Patent is:

1. A magnetic tape scanning arrangement comprising, in combination, a magnetic tape movable along its longitudinal axis; tape transport means in contact with said tape and applying longitudinal motion to said tape; a rotatable member with periphery in proximity to said moving tape; transducer heads circumferentially mounted on said member; guide means for guiding said tape against said transducer head for transverse scanning of said tape by said heads; electric motor means; first drive means mechanically connecting said motor to said rotatable member for imparting rotary motion to said rotatable member by said motor means; second drive means mechanically connecting said motor means to said tape transport means, whereby the longitudinal speed of said tape driven by said tape transport means is in predetermined relationship to the angular speed of said rotatable member; and variable slip means in said first drive means having electrically controllable slip through an applied electrical signal dependent upon the relative position of said transducer heads with said tracks on said tape, said slip being controlled so as to establish a predetermined relative position of said transducer heads with said tracks.

2. A magnetic tape scanning arrangement comprising, in combination, a magnetic tape movable along its longitudinal axis; tape transport means in contact with said tape in applying longitudinal motion to said tape; a rotatable member with periphery in proximity to said moving tape; transducer heads circumferentially mounted on said member; guide means for guiding said tape against said transducer heads for transverse scanning of said tape by said heads; electric motor means; first drive means mechanically connecting said motor to said rotatable member for imparting rotary motion to said rotatable member by said motor means; second drive means mechanically connecing said motor means to said tape transport means, whereby the longitudinal speed of said tape driven by said tape transport means is in predetermined relationship to the angular speed of said rotatable member; and slip clutch means in said first drive means having electrically controllable slip through an applied electrical signal dependent upon the relative position of said transducer heads with said tracks on said tape, said slip being controlled so as to establish a predetermined relative position of said transducer heads with said tracks.

3. The magnetic tape scanning arrangement as defined in claim 2, wherein said clutch means is a magnetic powder clutch.

4. The magnetic tape scanning arrangement as defined in claim 2, wherein said clutching means is an eddy-current clutch.

5. The magnetic tape scanning arrangement as defined in claim 2, including reduction gearing in said second drive means for modifying the speed of said tape transport means in relation to said motor means.

6. The magnetic tape scanning arrangement as defined in claim 2, including a first belt drive means in said first drive means and operatively connected to said motor means; a shaft driven by said first belt drive means at a speed higher than that of said motor means; third drive means including said cluitch means and connecting said shaft to said rotatable member; and second belt drive means in said second drive means and operatively connecting said motor means to said tape transport means.

7. Television tape reproducing means comprising, in combination, a magnetic tape having recorded thereon in record tracks extending transversely to said tape a television signal including synchronizing components; tape transport means for applying longitudinal motion to said tape; a rotatable member; transducer heads circumferentially spaced about said member and mounted thereon; an electric motor having a predetermined speed of rotation; an electrically controllable slipping clutch; exciting current connections for said clutch; first drive means including said clutch and drivingly connecting said motor to said rotatable member; second drive means including reduction gearing and drivingly connecting said motor to said tape transport means; guide means for guiding said tape in proximity of said member whereby said transducer heads scan said record tracks to reproduce said television signal; a local source of television synchronizing signals; comparator means having first and second inputs and an output, said comparator developing at said output a signal representative of the phase relationship between signals applied to said inputs; means for applying said synchronizing components of said television signal to said first input; means for applying said synchronizing signals to said second input of said comparator; a voltage controlled current source providing an electric current dependent upon an applied voltage; means for applying said output signal from said comparator output to control said source; and means for applying current from said source to said exciting current connections of said clutch.

8. Television tape reproducing means as defined in claim 7, wherein said tracks extend substantially perpendicular to the longitudinal axis of said tape.

9. Television tape reproducing means as defined in claim 7, wherein said tracks are inclined at small angles to the longitudinal axis of said tape.

10. The television tape reproducing means as defined in claim 7, wherein said clutch is a magnetic powder clutch.

11. The television tape reproducing means as defined in claim 7, wherein said clutch is an eddy-current clutch.

12. The television tape reproducing means as defined in claim 7, wherein said first drive means comprises mechanical connecting means connecting said motor means to said rotatable member through said slipping clutch, the speed of said motor being higher than the speed of rotation of said rotatable member.

13. The television tape reproducing means as defined in claim 7, including first belt drive means in said first drive means and operatively connected to said motor; a shaft in said first drive means and connected to said first belt drive means so that said motor is mechanically linked to said shaft and drives said shaft at a speed higher than that of said rotatable member; connecting means in said first drive means and connecting said clutch to said shaft for driving said rotatable member with controlled slip of said clutch and producing thereby the desired speed of rotation of said rotatable member; and second belt drive means in said second drive means and connecting said motor to said tape transport means so that the speed of said tape transport means is lower than that of said motor, the speed of said motor being intermediate between the speeds of said rotatable member and said transport means.

References Cited

UNITED STATES PATENTS

| | | | |
|---|---|---|---|
| 3,179,870 | 4/1965 | Maxey | 178—6.6 |
| 3,201,674 | 8/1965 | Wada | 178—6.6 |
| 3,320,370 | 5/1967 | Barry | 178—6.6 |

ROBERT L. GRIFFIN, *Primary Examiner.*

HOWARD W. BRITTON, *Assistant Examiner.*

U.S. Cl. X.R.

179—100.2